THOMAS O. SUMMERS, JR.
INVENTOR.

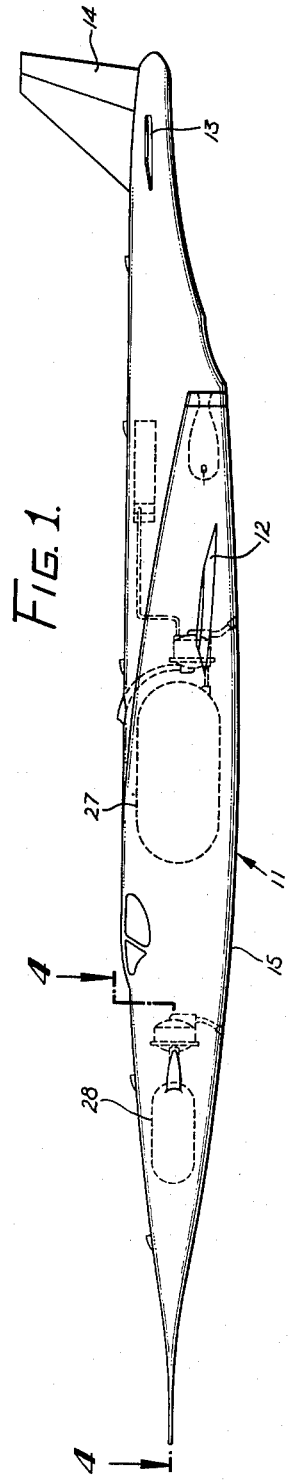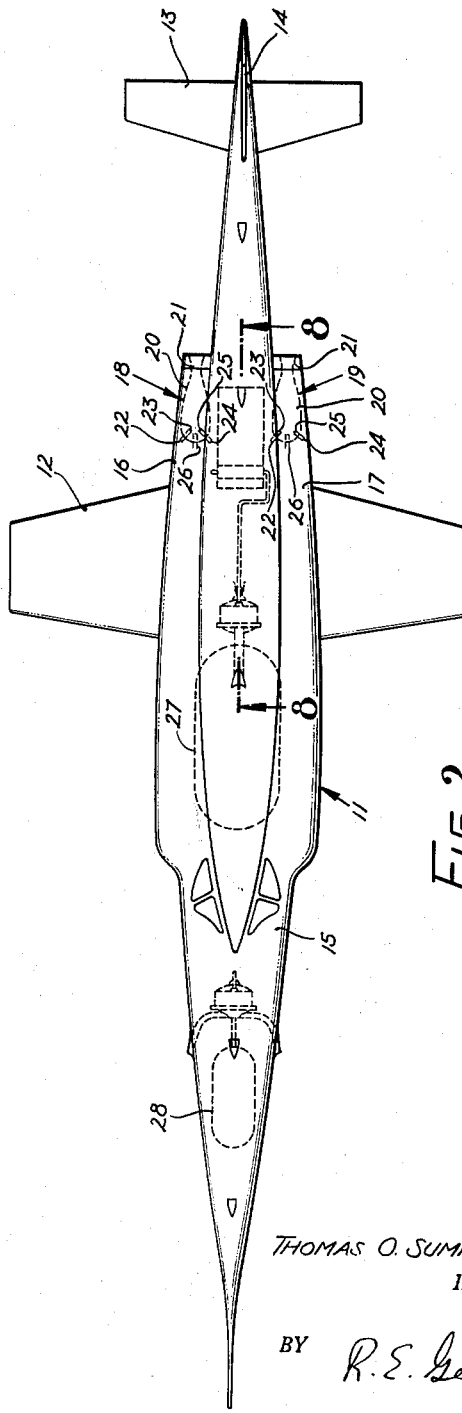
THOMAS O. SUMMERS, JR.
INVENTOR.

BY R. E. Geauque
ATTORNEY

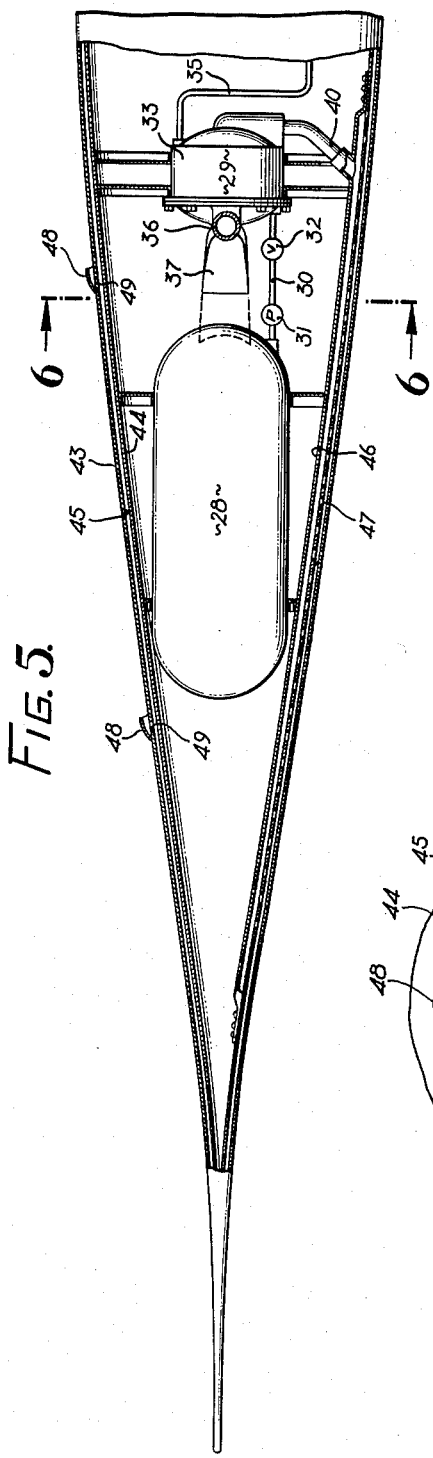
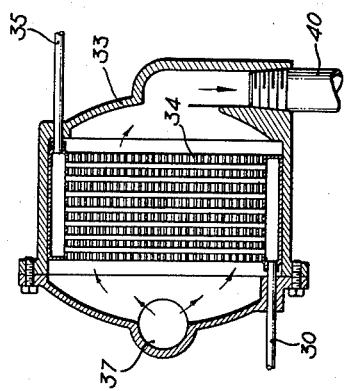
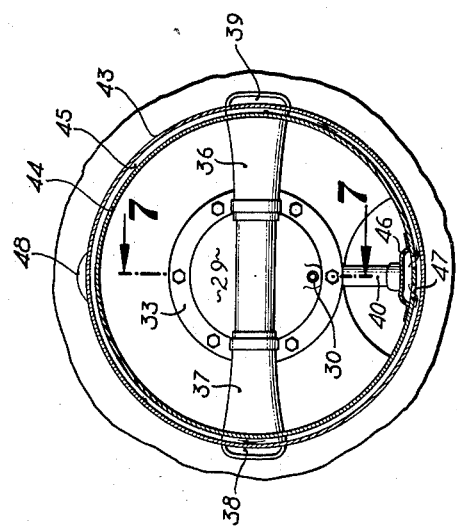

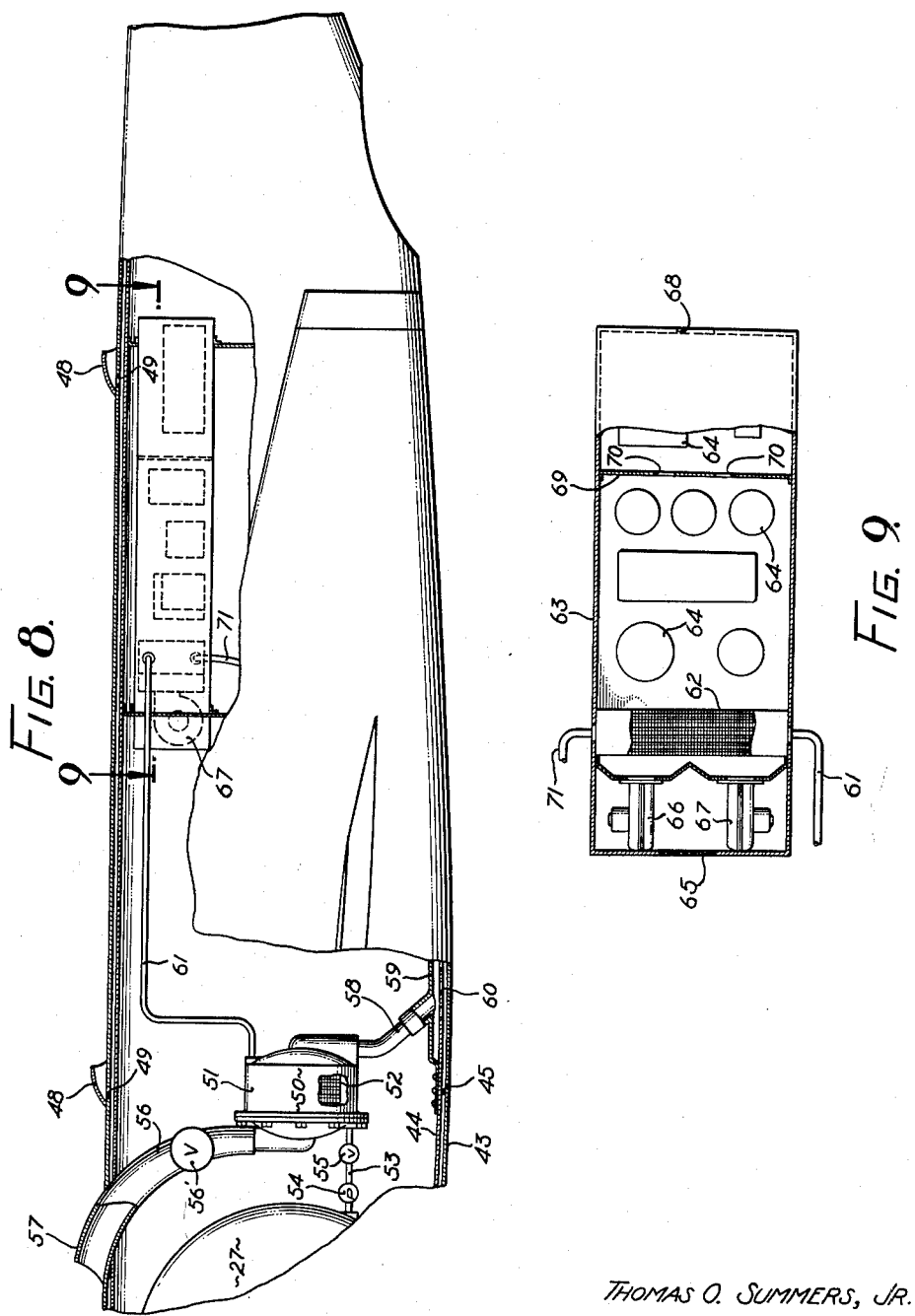

United States Patent Office 2,958,482
Patented Nov. 1, 1960

2,958,482

COOLING SYSTEM FOR AIRCRAFT SKIN AND ACCESSORIES

Thomas O. Summers, Jr., Encino, Calif., assignor, by mesne assignments, to The Garrett Corporation, Los Angeles, Calif., a corporation of California Filed Mar. 30, 1955, Ser. No. 497,920

12 Claims. (Cl. 244—74)

This invention relates to a cooling system for the skin and accessories of a high-speed aircraft and more particularly to a cooling system for an aircraft which is propelled by separate supplies of low temperature fuel and oxidant.

It is well known that the skin of an aircraft or missile which is capable of moving at supersonic and hypersonic speeds, becomes very hot because of air friction and this aerodynamic heating of the outer skin requires reinforcement of the skin to prevent failure of the aircraft by overheating of the skin. It is possible to increase the resistance of the skin to these high temperatures by coating the skin with refractory materials, but such coatings add weight to the structure and make the skin unsuitable to resist flexural loads. The present invention is utilized in connection with an aircraft having engines which are operated on supplies of low temperature fuel and low temperature oxidant in either liquid or gaseous form and one or both of these low temperature substances may be utilized to cool the skin during flight and prior to the time the substances enter the engine. For this purpose, a divided skin is utilized for the outer surface of the aircraft and air cooled by the low temperature substances is circulated between the layers of the skin to cool the outer surface. Thus, the divided skin can withstand the aerodynamic heating without the necessity of coating the skin and without the necessity of substantially increasing the weight of the aircraft because low temperature fuel and oxidant are continually available. Also, the low temperature substances can be utilized to cool the accessory compartments of the aircraft prior to entering the engine by directing the substances to a cooling unit for the accessories.

It is therefore an object of the present invention to provide a cooling system for the skin and accessories of an aircraft capable of flying at supersonic speed, which consists of utilizing low temperature fuel or oxidant supplies prior to their entrance into the engine of the aircraft.

Another object of the present invention is to provide a system for cooling the skin and accessories of an aircraft which is propelled by separate supplies of low temperature liquid fuel and low temperature liquid oxidant, the cooling system utilizing these substances to cool atmospheric air which is taken into the aircraft and circulated through the divided skin of the aircraft.

These and other objects of the invention not specifically set forth above will become readily apparent from the following description and drawings in which:

Figure 1 is a side elevational view of a high speed aircraft showing the location of the low temperature fuel tank and of the low temperature oxidant tank.

Figure 2 is a top plan view of the aircraft of Figure 1 illustrating the jet motors for the aircraft which are supplied with fuel and oxidant in order to propel the aircraft.

Figure 5 is a vertical section along line 5—5 of Figure 4 showing the cooling unit in the nose of the aircraft and the header for supplying the cool air to the space between the divided skins of the aircraft.

Figure 6 is a vertical transverse section along line 6—6 of Figure 5 illustrating the cooling unit for cooling the nose of the aircraft and the airscopes for the cooling unit.

Figure 7 is a vertical section along line 7—7 of Figure 6 showing the construction of the cooling unit for the cooling system in the nose of the aircraft.

Figure 8 is a vertical section along line 8—8 of Figure 2 showing the cooling unit connected to the fuel tank for cooling the aft portion of the aircraft surface and the accessory compartment.

Figure 9 is a horizontal section along 9—9 of Figure 8 illustrating the cooling unit for the accessory compartment of the aircraft.

Figure 3:
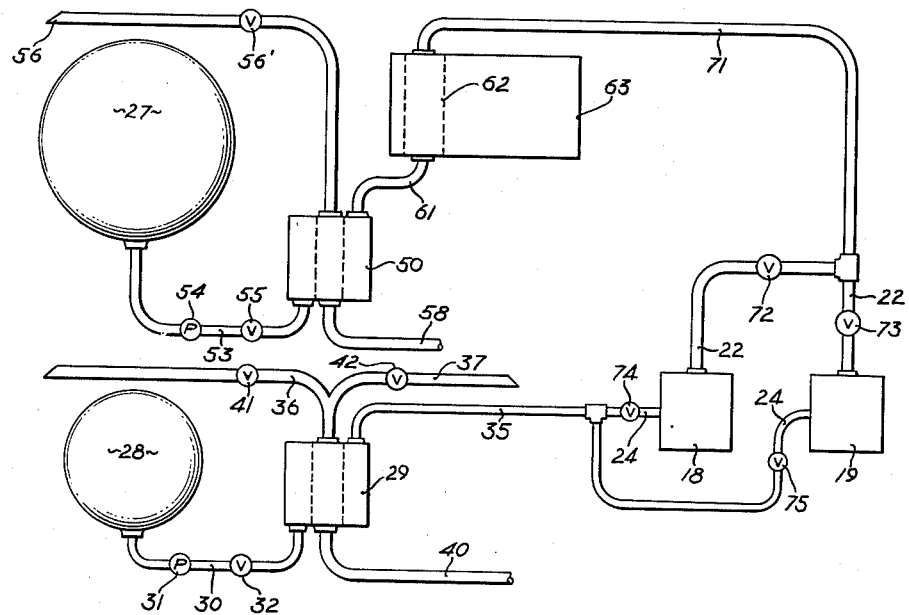
Figure 3 is a diagramtic view of the cooling system of the present invention illustrating the manner in which the low temperature fuel and low temperature oxidant are utilized to cool the skin and the accessory compartment of the aircraft.
Figure 4:
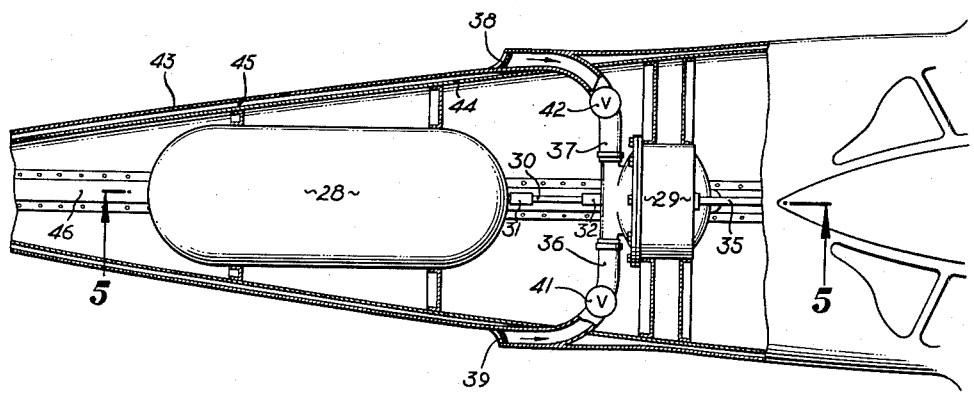
Figure 4 is a horizontal section along line 4—4 of Figure 1 showing the oxidant tank and cooling unit located in the nose of the aircraft.

Referring to Figures 1 and 2, a high speed aircraft 11 is shown which is capable of flying at supersonic speeds and the aircraft is equipped with wings 12, tail section 13, rudder 14 and cockpit section 15. In addition, the aircraft has two engine nacelles 16 and 17 which house the jet motors for propelling the aircraft at very high speed. During flight at supersonic speeds it is necessary to cool the aircraft skin since otherwise the skin will overheat and weaken the structure of the aircraft.

The nacelles 16 and 17 contain jet motors 18 and 19 respectively, which are each constructed of a casing 20 having a nozzle exit 21. The fuel is led to each of the motors thru a passage 22 which terminates in a jet fitting 23 within the casing 20 and the oxidant for the fuel is led to each of the motors thru a passage 24 which also terminates in a jet fitting 25 within the casing 20. The jet fittings for the fuel line and the oxidant line are directed toward each other and ignition of the fuel within the casing is maintained by an electrical plug 26. The exit of high-pressure, high-temperature combustion products from the nozzle end 21 of each motor results in a forward thrust being imparted to the aircraft. The fuel lines 22 to each of the engines are fed from heat exchangers which in turn are connected to the supply of low temperature fuel in tank 27, and the oxidant lines 24 are connected to a heat exchanger which in turn is connected to the supply of low temperature oxidant in tank 28.

The low temperature oxidant in tank 28 can be any suitable oxidant, such as liquid oxygen, and this low temperature liquid is connected to a heat exchanger 29 through a passage 30 which contains a pump 31 and a valve 32. The heat exchanger 29 has a split casing 33 containing a cooling coil 34 which is connected with passage 30 and which discharges through passage 35. Two inlet air passages 36 and 37 connect with casing 33 and terminate in air scoops 38 and 39, respectively, which project beyond the aircraft surface and into the air stream. The atmospheric air entering scoops 38 and 39 passes over the cooling coil 34 and is discharged from casing 33 through passage 40. Because of the heat removed from the air by the liquid in cooling coil 34, the passage 35 will contain the oxygen in gaseous form. The passage 35 connects with the passages 24 of the jet motors of the aircraft and the valve 32 serves to regulate the total amount of oxygen supplied to the motors by pump 31. The passages 36 and 37 contain valves 41 and 42 respectively, in order to regulate the amount of air passing to the heat exchanger 29.

The outer surfaces of the aircraft is formed of a divided skin composed of layers 43 and 44 which are spaced apart by any suitable spacing means to provide an intermediate cooling space 45. The cold air in passage 40 is led to a header 46 which is supported by layer 44 in a longitudinal position along the nose section of the aircraft, and the layer 44 of the skin beneath the header contains a series of openings 47 which permit the cold air to pass into the space 45 between the layers of skin. This cold air can then circulate completely around the nose of the aircraft in order to prevent overheating of the outer skin layer 43. A number of reverse scoops 48 are positioned over openings 49 in the outer layer 43 in order to exhaust the space 45 and prevent excessive pressure from building up between the layers of skin. Thus, the low temperature liquid oxygen in the tank 28 can be utilized to cool a quantity of incoming air and this cold air can be circulated between the layers of the divided skin in order to continually protect the surface of the aircraft from overheating. The discharge from the cooling coil 34 is led directly to the motor of the aircraft where it is utilized to burn the fuel.

The low temperature fuel in tank 27 can be any suitable fuel, such as liquid hydrogen, and this fuel is led to a heat exchanger 50 which is similar in construction to heat exchanger 29. Casing 51 of heat exchanger 50 contains a cooling coil 52 which is connected to fuel tank 27 through passage 53 containing a pump 54 and a valve 55. A passage 56 containing valve 56' connects casing 51 with an external air scoop 57, so that atmospheric air is passed around the cooling coil 52 and is discharged through a passage 58 which connects with a header 59 extending along the lower, aft section of the aircraft fuselage and secured to skin layer 44. The header 59 is similar in construction to the header 46 and discharges to the space 45 between the layers of the skins through a plurality of openings 60 in the layer 44. Thus, the air which has been cooled by the heat exchanger 50 can be circulated around the outer skin which covers the aft section of the aircraft in order to keep this outer skin cool and prevent the skin from becoming overheated. A number of reverse scoops 48 are positioned opposite the header 59 and connect with openings 49 in outer layer 43 in order to discharge the cool air after it has passed through the space 45 to cool the skin.

The fuel is discharged from cooling coil 52 through a passage 61 leading to a second cooling unit 62 which is placed within the auxiliary equipment compartment 63. The compartment 63 contains electronic components 64 which generate considerable heat and therefore must be cooled. A screened opening 65 is positioned at one end of the compartment 63 and blowers 66 and 67 force air from screened opening 65 over the cooling unit 62 and over the electronic components. Opening 68 is positioned at the other end of the compartment for discharging the air after it has passed over the electronic components and the compartment also has a shield 69 with openings 70 to permit circulation of the air cooled by unit 62. The cooling unit 62 discharges through a passage 71 which connects with passages 22 to supply vaporized fuel to the jet motors. It is understood that the liquid fuel in tank 27 will be vaporized by the heat absorbed in heat exchanger 50 and cooling unit 62.

The total outer surface of the aircraft is formed of the divided skin and the space 45 is continuous throughout the surface of the aircraft. When liquid hydrogen is used as the fuel supply and liquid oxygen is used as the oxygen supply, the liquid entering the heat exchanger 50 will be at a lower temperature than the liquid entering the heat exchanger 29. However, by properly regulating the air flow through these two heat exchangers by valve 41, 42 and 56', the cold air supply from both heat exchangers to space 45 can be maintained at about the same temperature. Since hydrogen has a higher specific heat than oxygen, considerably more cool air can be supplied from the heat exchanger 50 than from the heat exchanger 29 and thus the liquid hydrogen can be utilized to cool more of the aircraft surface.

The operation of the invention will now be briefly described in connection with Figure 3. Low temperature fuel is removed from tank 27 by pump 54 in a quantity regulated by valve 55 and this fuel passes through the heat exchanger 50 to cool the atmospheric air taken in by scoop 56. Cold atmospheric air leaves the heat exchanger 50 through passage 58 which leads to the header 59 and the header distributes the cold air to the space 45 between the divided skin. The discharge of fuel from heat exchanger 50 is led by passage 61 to the cooling unit 62 located in the accessory compartment of the aircraft and air is forced over this cooling unit in order to cool the accessories in the compartment. The fuel in the form of a gas leaves the cooling unit 62 thru passage 71 which connects with the passages 22 leading to engines 18 and 19. Valve 72 and 73 are placed in the passages 22 to regulate the amount of the fuel flow to each of the engines and thus keep the engines in balance. The cold air leaving the heat exchanger 50 thru passage 58 will cool the aft section of the aircraft fuselage by circulating from the header 59 through space 45 around the fuselage to the discharge openings 49 in the outer skin 43.

The nose section of the aircraft is cooled by low temperature oxidant which is pumped from tank 28 by pump 31 in a quantity controlled by valve 32. This oxidant is directed to heat exchanger 29 by passage 30 and serves to cool the incoming atmospheric air collected by scoops 36 and 37. The air cooled by the heat exchanger 29 is directed by passage 40 to header 46 from which it is distributed along the nose section of the aircraft to the space 45. The oxidant in the form of a gas is discharged from heat exchanger 29 through the passage 35 which connects with passages 24 leading to the engines 18 and 19 and the valves 74 and 75 in these passages control the supply of oxidant to each of the engines. The mixture of fuel and oxidant is continually ignited in the jet engines 18 and 19 in order to propel the aircraft at supresonic or hypersonic speed. because of the various valves utilized in the cooling system, it is possible to regulate the supply of incoming air and the supply of fuel and oxygen passing to the jet motors. Thus, the cooling system can be regulated in any desired manner and the temperature and the quantity of cold air entering the space 45 and the output of the jet motors can be controlled in any desired manner.

By the present invention, a novel cooling system for aircraft skin and accessories is provided in which low temperature fuel and oxidant are utilized in heat exchangers to cool air for use as the refrigerant. In the preferred form of the invention, liquid hydrogen is utilized as the fuel and liquid oxygen is utilized as the oxidant and since the liquid hydrogen has a higher specific heat and lower liquid temperature, the fuel supply will be capable of carrying a substantially greater portion of the cooling load. However, the invention is not limited to the use of the particular fuel and oxidant since other suitable low temperature fuels and oxidants can be utilized, either in the liquid or gaseous phase. While air has been utilized as the cooling medium for the skin and accessories, it is also understood that the low temperature fuel and low temperature oxidant could be supplied directly to the space 45 and circulated thru the space before entering the jet motors and in such a system, it would be necessary to divide the space 45 into a fuel space and an oxidant space so that the fuel and oxidant could not mix together. It is further understood that the complete cooling of the aircraft skin and accessories can be accomplished solely by the low temperature fuel supply or solely by the low temperature oxidant supply. Various other modifications are contemplated by those skilled in the art without departing from the spirit and scope of the invention as hereinafter defined by the appended claims.

What is claimed is:

1. In an aircraft having a cooling system and separate supplies of low temperature fuel and low temperature oxidant, propelling means for said aircraft utilizing said fuel and oxidant, a first heat exchanger means connected between said fuel supply and said propelling means, a second heat exchanger means connected between said oxidant supply and said propelling means, means for passing atmospheric air over each of said heat exchanger means to cool said air to a low temperature, a skin for said aircraft comprising spaced layers forming a cooling space, means for discharging said cool air into said space, said fuel and oxidant being ignited in the propelling means after cooling said air in order to propel said aircraft.

2. In an aircraft having an engine and cooling system, an outer surface for said aircraft formed of inner and outer layers of skin providing a cooling space therebetween which extends over the entire surface of the aircraft, a supply of low temperature fuel and a supply of low temperature oxidant carried in separate tanks within said aircraft for use in said engine, a first heat exchanger positioned between said oxidant tank and said engine and a second heat exchanger positioned between said fuel tank and said engine, air scoop means for supplying atmospheric air to said first and second heat exchangers, means for connecting the cool air discharged from said first and second heat exchangers to separate header means supported by said inner layer and positioned along the fore and aft portion, respectively, of the aircraft, a series of openings in said inner layer for connecting said header means with the cooling space between said layers so that the cool air from both said heat exchangers can circulate around said aircraft, and means for venting the air in the space between said layers to atmosphere after said air has cooled said layers of skin.

3. In an aircraft as defined in claim 2, valve means for controlling the flow of atmospheric air to each of said first and second heat exchangers and valve means for controlling the flow of oxidant and fuel to said first and second heat exchangers respectively, both said valve means serving to regulate the quantity and temperature of the cold air passing to said cooling space and to regulate the quantity of fuel and oxidant flowing to the engine.

4. In a high speed aircraft having propelling means and a cooling system, a supply tank carried by said aircraft and containing low temperature liquid hydrogen, means for connecting said hydrogen with said propelling means to utilize said hydrogen tank as fuel for said propelling means, heat exchanger means located in said connecting means and receiving said low temperature hydrogen directly from said tank for use as a refrigerant of high specific heat, external scoop means carried by said aircraft for supplying atmospheric air to said heat exchanger means to cool said air, an outer surface for said aircraft comprising spaced skin layers forming a cooling passage therebetween, and means for connecting the cooled air discharged from said heat exchanger means with said cooling passage to prevent overheating of said outer surface during high speed flight, said low temperature hydrogen entering said heat exchanger means being capable of high heat absorption from the ram air collected by said scoop means because of its low temperature and high specific heat.

5. In an aircraft having a cooling system, a fuel supply of low temperature liquid hydrogen, an oxidant supply of low temperature liquid oxygen, propelling means connected with said fuel supply and said oxidant supply for combusting said hydrogen with said oxygen, a first heat exchanger means connected between said hydrogen supply and said propelling means and a second heat exchanger means connected between said oxygen supply and said propelling means, and separate cooling mediums circulated through said heat exchanger means and through portions of said aircraft to cool portions of said aircraft.

6. In an aircraft as defined in claim 5 wherein said separate cooling mediums comprise separate portions of atmospheric air, and intake means carried by said aircraft for collecting said separate portions of atmospheric air.

7. In a high speed aircraft having a cooling system, a fuel supply of low temperature liquid hydrogen, an oxidant supply of low temperature liquid oxygen, propelling means for combusting hydrogen with oxygen, means for connecting said propelling means with said fuel supply and containing a first heat exchanger, means for connecting said propelling means with said oxidant supply and containing a second heat exchanger, intake means carried by said aircraft for passing separate portions of atmospheric air through both said heat exchangers to cool said air, a skin for said aircraft comprising spaced layers forming a cooling space, means for discharging the cooled air from both of said heat exchangers into said cooling space to prevent overheating of said skin at high speeds, and means for regulating the flow rate of atmospheric air through both heat exchangers to control the temperature of the cooled air discharged from each heat exchanger, said liquid hydrogen having a greater cooling capacity than said liquid oxygen because of its lower temperature and higher specific heat.

8. In an aircraft, a supply tank for storing a low temperature fluid, heat exchanger means directly connected with said tank and receiving said fluid at substantially tank temperature as a cooling medium, propelling means for said aircraft utilizing said fluid to produce power, means for connecting the fluid discharged from said heat exchanger means with said propelling means, means for passing atmospheric air through said heat exchanger means to cool the air, and means for circulating the cooled air discharged from said heat exchanger means through portions of said aircraft.

9. In a high speed aircraft having propelling means and a cooling system, a fuel supply tank carried by said aircraft and containing low temperature liquid hydrogen, means for connecting said hydrogen supply tank with said propelling means so that said hydrogen can be combusted within said propelling means, heat exchanger means located in said connecting means and receiving said low temperature hydrogen directly from said tank at substantially tank temperature for use as a refrigerant of high specific heat, means for passing a supply of atmospheric air through said heat exchanger means in order to cool the air with the low temperature hydrogen, and means for circulating the cooled air discharged from said heat exchanger means through portions of said aircraft in order to cool portions of said aircraft, said hydrogen being capable of high heat absorption from the atmospheric air because of its low temperature and high specific heat.

10. In a high speed aircraft having propelling means and a cooling system, an oxidant supply tank carried by said aircraft and containing low temperature liquid oxygen, means for connecting said oxygen supply tank with said propelling means to maintain combustion of fuel within said propelling means, heat exchanger means located in said connecting means and receiving said low temperature oxygen directly from said tank at sustantially tank temperature for use as a refrigerant, means for passing a supply of atmospheric air through said heat exchanger means in order to cool the air with the low temperature oxygen, and means for circulating the cooled air discharged from said heat exchanger means through portions of said aircraft in order to cool portions of said aircraft, said oxygen being capable of high heat absorption from the atmospheric air because of its low temperature.

11. In an aircraft, a supply tank for storing a low temperature fluid, heat exchanger means connected with said tank and utilizing said fluid as a cooling medium, propelling means for said aircraft utilizing said fluid to produce power, means for connecting the fluid discharged from said heat exchanger means with said propelling means, means for passing atmospheric air through said heat exchanger means to cool the air, and means for circulating the cooled air discharged from said heat exchanger means through portions of said aircraft, the outer surface of said aircraft comprising a divided skin forming a cooling space, said circulating means supplying said cooled atmospheric air to said cooling space in order to cool the skin during flight.

12. In an aircraft, a supply tank for storing a fluid in the form of a low temperature liquid gas, heat exchanger means directly connected with said tank and receiving said fluid at substantially tank temperature as a cooling medium, propelling means for said aircraft utilizing said fluid to produce power, means for connecting the fluid discharged from said heat exchanger means with said propelling means, means for passing atmospheric air directly to said heat exchanger means to cool the air, and means for circulating the cooled air discharged from said heat exchanger means directly to portions of said aircraft, said atmospheric air being in heat exchange relationship solely with said heat exchanger means prior to cooling portions of said aircraft so that the temperature of said air is unaffected by other power means prior to cooling portions of said aircraft.

References Cited in the file of this patent

UNITED STATES PATENTS

| | | |
|---|---|---|
| 969,440 | Askew | Sept. 6, 1910 |
| 1,905,971 | Davisson | Apr. 25, 1933 |
| 2,063,477 | Young | Dec. 8, 1936 |
| 2,327,737 | Pendergast | Aug. 24, 1943 |
| 2,398,655 | Mayer | Apr. 16, 1946 |
| 2,406,926 | Summerfield | Sept. 3, 1946 |
| 2,473,496 | Mayer | June 14, 1949 |
| 2,654,580 | Shaw | Oct. 6, 1953 |

UNITED STATES PATENT OFFICE
CERTIFICATION OF CORRECTION

Patent No. 2,958,482                  November 1, 1960

Thomas O. Summers, Jr.

It is hereby certified that error appears in the above numbered patent requiring correction and that the said Letters Patent should read as corrected below.

Column 3, line 1, for "surfaces" read -- surface --; column 5, line 57, after "hydrogen" insert -- tank --; line 58, strike out "tank".

Signed and sealed this 27th day of June 1961.

(SEAL)
Attest:

ERNEST W. SWIDER
Attesting Officer

DAVID L. LADD
Commissioner of Patents